United States Patent [19]
Durham

[11] 3,819,280
[45] June 25, 1974

[54] OPTICAL SURVEYING INSTRUMENT

[75] Inventor: John Anthony Douglas Bruce Durham, London, England

[73] Assignee: National Research Development Corporation, London, England

[22] Filed: Jan. 4, 1972

[21] Appl. No.: 215,371

[52] U.S. Cl.............................. 356/249, 356/255
[51] Int. Cl.............................................. G01c 9/18
[58] Field of Search.............................. 356/12–19, 356/253–255, 144–146, 249; 350/286, 287

[56] References Cited
UNITED STATES PATENTS

| | | | |
|---|---|---|---|
| 1,021,306 | 3/1912 | Eppenstein | 356/19 |
| 1,066,906 | 7/1913 | Jacob | 356/19 |
| 1,074,935 | 10/1913 | Eppenstein | 356/19 |
| 2,566,312 | 9/1951 | Cable | 356/145 |

Primary Examiner—Ronald L. Wibert
Assistant Examiner—F. L. Evans
Attorney, Agent, or Firm—Fleit, Gipple & Jacobson

[57] ABSTRACT

Surveying instrument apparatus either in the form of the instrument itself or an attachment to an existing instrument, in which two optical paths are formed and a distant object is observed as two images superimposed on one another. One path is directly through, and at an acute angle to a part silvered mirror to give an upright image, while the second path involves reflection off three planar surfaces in three different planes to provide an inverted image by reflections from the part silvered mirror, with the objectives of the two paths laterally spaced. By coinciding the two images, rapid alignment and levelling of the instrument is possible with no eye strain.

9 Claims, 5 Drawing Figures

PATENTED JUN 25 1974 3,819,280

OPTICAL SURVEYING INSTRUMENT

BACKGROUND TO THE INVENTION

The present invention relates to optical surveying instruments, and is particularly concerned with such an instrument which can be used as a level, or may be attached for use with a standard form of level.

In the conventional dumpy level, cross-wires on a telescope are sighted against the sighting rod at a distant point, the reading of height on the sighting rod being recorded by the surveyor. Before readings can be taken, the level has to be set up so that the axis of the telescope is accurately horizontal, this being effected by operating a number of adjusting feet, until a spirit level type bubble or vial indicates that the level is horizontal. This, for general purposes, has been superceded by one of two types of automatic level. Such automatic levels are relatively expensive to manufacture, and also have the disadvantage, that they can cause severe eyestrain to a surveyor using them.

SUMMARY OF THE INVENTION

It is an object of the present invention to provide an instrument which can be used in place of, or in combination with a conventional level.

According to the present invention there is provided surveying instrument apparatus, which may form the instrument itself or an attachment for a surveying instrument, comprising means for obtaining two optical paths, one optical path being through a first aperture in a screen and directly through and at an acute angle to semi-reflecting surface, to provide an upright image of an object being observed, a second aperture in the screen and three planar reflecting surfaces disposed in three different planes so as to produce a second optical path to provide an inverted image of the object being observed by reflection from said semi-reflecting surface, and superimposed on the upright image, the apertures of said two optical paths being laterally spaced apart.

The invention also provides a surveying instrument apparatus comprising means for obtaining two optical paths, one optical path being directly through, and at an acute angle to, a semi-reflecting surface, to provide an upright image of an object being observed, and three planar reflecting surfaces disposed in three different planes so as to produce a second optical path, to provide an inverted image of the object being observed by reflection from said semi-reflecting surface, and superimposed on the upright image, a first and second of said reflecting surfaces being disposed perpendicular to one another to provide a portion of said second optical path extending in an optical plane normal to both said first and second surfaces, the third reflecting surface being disposed perpendicular to said semi-reflecting surface and at 45° to said optical plane.

According to a preferred embodiment, this second optical path is produced by three isosceles triangle prisms of equal size, a first and second of said prisms having their shorter faces secured together and located in a first plane, the third prism having one of its shorter faces secured to the other shorter face of the second prism, the unsecured shorter face of the third prism being arranged in a second plane perpendicular to said first plane, the unsecured shorter face of the third prism being placed adjacent, and at 45°, to the semi-reflecting surface, e.g. a part silvered mirror, the hypotenuses of said prisms forming said three planar reflecting surfaces. In another construction the same effect may be achieved by using mirrors at the locations of the hypotenuses of the prisms described above, instead of the prisms themselves.

The instrument is preferably used as an attachment for a standard form of optical sighting level, and is used firstly for the purpose of making a quick sighting on the chain-man's rod, and secondly to view a spirit level vial associated therewith which ensures that the optical level telescope is horizontal. Thus, by moving the eye only once, from the eyepiece of the attachment, to the eyepiece of the telescope, the level can be set up and the chain-man's rod observed instantly. This greatly reduces eyestrain on the surveyor.

With such an attachment, the prisms may be so mounted that the said first plane securing the first and second prisms together, is substantially 45° to the horizontal, and a spirit level vial is secured relative to said prisms, first and second reflective faces being mounted above the ends of the bubble of the spirit level vial, when the latter is in the horizontal position, the first relative face being arranged in front of the semi-reflecting surface, and the second relective face being arranged in front of the free face of the first prism, whereby an image of one end of the bubble is produced adjacently an inverted image of the other end of the bubble. This whole assembly may be adjustably mounted in an enclosed box which is adapted to be attached to a standard sighting level.

In order that the invention may be more readily understood, the following description is given, merely by way of example, reference being made to the accompanying drawings.

DETAILED DESCRIPTION OF A PREFERRED EMBODIMENT

Figure 2:
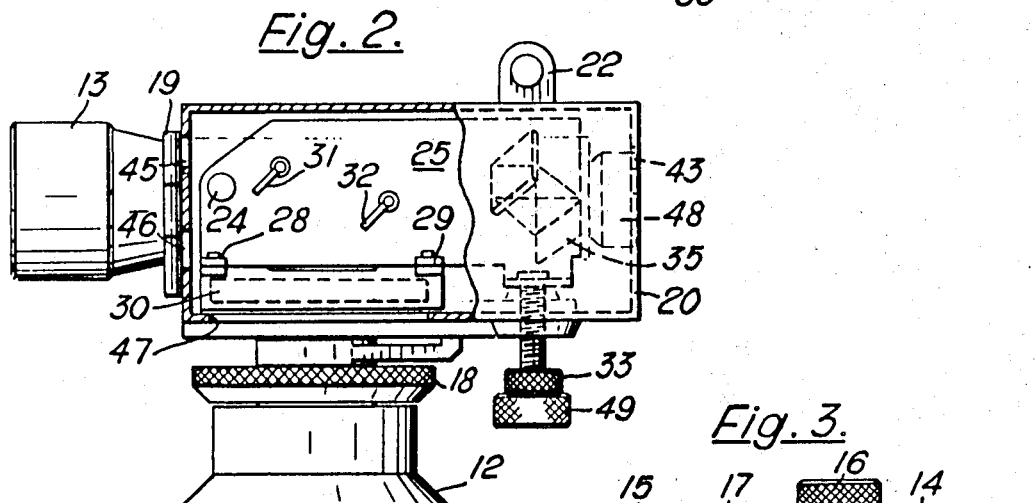
FIG. 2 is a side elevation, partly in section, of a quick-set level provided with one form of attachment, according to the invention, including the optical system of FIG. 1.
Figure 3:
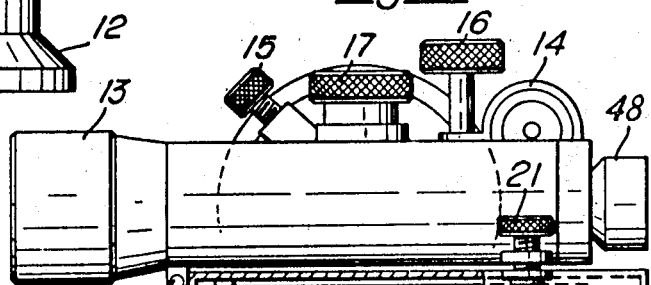
FIG. 3 is a top plan view of the quick-set level and attachment of FIG. 2.
Figure 4:
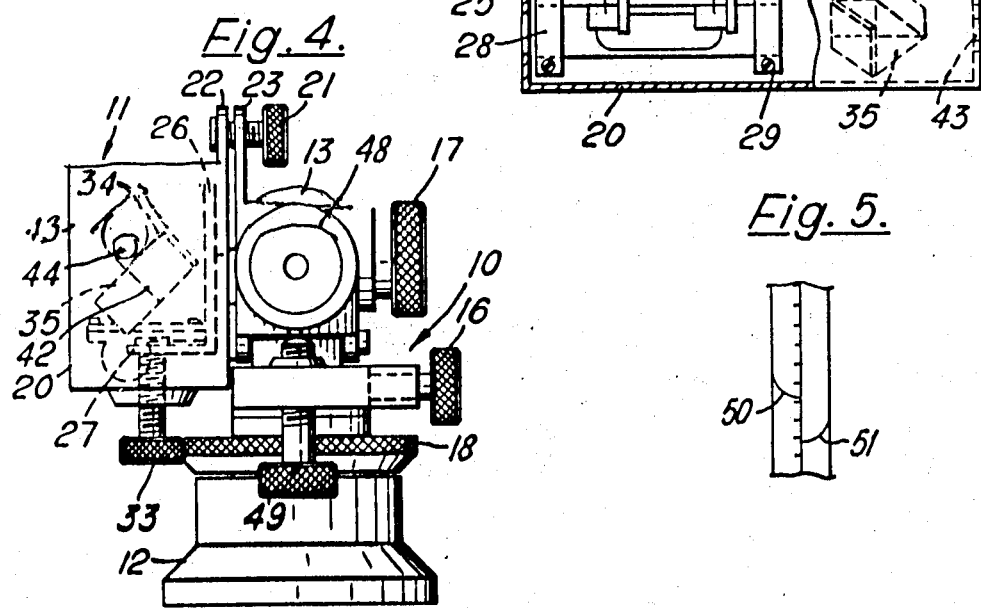
FIG. 4 is an end elevation, from the eyepiece end, of the quick-set level of FIGS. 2 and 3.

Referring now to FIGS. 2, 3 and 4 of the drawings, there is illustrated a standard form of quick-set level 10, to which there is secured a sighting attachment 11, according to the present invention.

The quick-set level includes a pedestal 12 which may be secured to a tripod, and mounted on the pedestal, for rotation about a vertical axis, is a telescope 13. A vial 14 may be used to adjust the pedestal 12 in an upright position on a tripod. Coarse adjustment of the rotational position of the telescope with respect to the pedestal may be effected by hand, and a locking screw 15 may then be tightened to lock the support of the telescope with respect to the pedestal. A fine adjustment of the rotational position of the telescope may then be effected by using an adjustment screw 16. The final control on the telescope is a focusing wheel 17, as can be seen in FIGS. 3 and 4. Surrounding the support for the telescope on the pedestal, is an annular scale 18, which is calibrated up to 360° and is provided with a knurled edge.

Secured on the side of the telescope, by means of a vertical pivot 19, is an enclosed housing 20, the rotational position of which, relative to the telescope, may be regulated by means of an adjusting screw 21, captive in a lug 22 at the top of the box 20, and threaded in a similar lug 23 on the telescope 13.

Mounted within the box 20, on a horizontal pin 24, is an angled-plate mounting member 25 having a vertical arm 26 and, at the right end as seen in FIG. 4, a horizontal arm 27. A pair of horizontal lugs 28, 29 are formed on the member 25, and mounted under lugs 28 and 29 is a spirit level vial 30. The spirit level vial 30 is of a standard form, and the length of the bubble therein, is such that, with the vial horizontal, the ends of the bubble are located immediately below a first mirror 31 and a second mirror 32, both inclined with their planes at 45° to the horizontal.

In order to adjust the position of the plate 25 with respect to the horizontal pin 24, an adjusting screw 33, threaded to the box 20, is captive in the portion 27 of the member 25.

Figure 1:
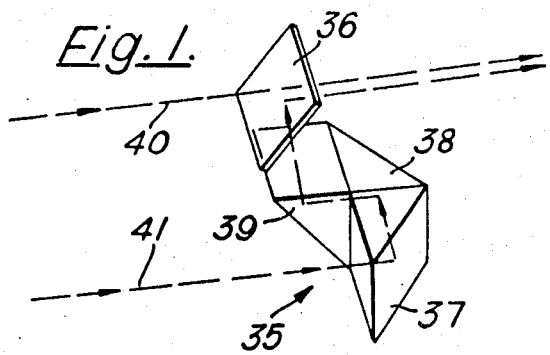
FIG. 1 is a schematic perspective view of the optical system incorporated in the preferred embodiment of the invention.

Also mounted within the box, on an arm 34 of the member 25, is an optical system 35. This system is depicted schematically in FIG. 1 and includes a part-silvered mirror 36 and three identical isosceles right-angled prisms 37, 38 and 39. One of the shorter sides of the first prism 37 is secured by adhesive to one of the shorter sides of the second prism 38, and the other shorter side of the second prism is secured, again by adhesive, to one of the shorter side of the third prism 39. The remaining shorter face of the third prism 39 is placed adjacent to and at 45° to the part-silvered mirror 36. With this arrangement, two optical paths 40 and 41 may be produced. The first optical path 40 is produced by light passing directly through the part-silvered mirror 36, and the second optical path is produced by light passing through the free face of the first prism 37, being totally internally reflected off the three hypotenuses of the first, second and third prisms 37, 38 and 39, and finally being reflected by the part-silvered mirror 36. With this arrangement, an inverted image is produced by the second optical path on the mirror 36. It will be noted that the hypotenuse face of prism 37 is perpendicular to the hypotenuse face of prism 38, and that the optical path 41 includes a portion (in which it is reflected off these two faces) in an optical plane normal to both of these faces. As can be seen from FIG. 4, the common face 42 between the first and second prisms 37, 38 is at 45° to the horizontal.

Immediately behind the part-silvered mirror 36 the box is provided with an aperture 43, the lower part of which is formed with an eyepiece lens 44. At the other end of the box, there are provided two objective apertures 45 and 46 positioned relative to the optical system 35, to allow light on the first and second optical paths 40 and 41 to pass therethrough, through the part-silvered mirror 36 and onto the first prism 37, respectively.

Similarly, the two mirrors 31 and 32 are so located as to be between these optical paths, and to the right hand side thereof, as viewed in FIG. 4. Below the vial 30 is an aperture 47 in the bottom wall of the box, to allow light to pass through the vial permitting the bubble to be viewed through the mirrors 31 and 32.

As can be seen in FIGS. 2 and 4, the centre-line of the optical system 35 is at the same level as the eyepiece 48 of the telescope 13, provided the optical system is levelled with respect to the bubble.

The final adjustment for the telescope is the further control 49 which effects vertical adjustment of the telescope with respect to its support, this adjustment also being transmitted to the box 20.

In use, the above described attachment is fitted to the telescope, and the adjustment screws 21 and 33 are operated, so that the two optical paths 40 and 41 both produce an image in the aperture 43 which is identical with the image on the crosswires of the telescope 13. These adjustments are effected before going into the field, the attachment thus being matched to the telescope of the level. No further adjustment of the screws 21 and 33 is then necessary.

Figure 5:
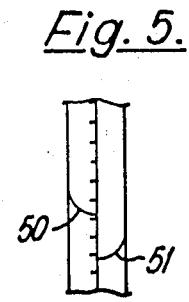
FIG. 5 illustrates what may be seen through the eyepiece of the attachment, when adjusting the level of the telescope.

When using the level in the field, the surveyor rotates the telescope looking through the aperture 43, above the eyepiece 44, until he sees the chain-man's rod, which will appear as two images via the optical paths 40 and 41. These two images will be side by side, and can be brought on top of one another by rotation of the telescope. Thus an accurate sighting of the telescope on the chain-man's rod can be effected quickly. The surveyor looks through the eyepiece 44, and will see two images of the ends of the bubble, one via the mirror 31 and the optical path 40, and the other via the mirror 32 and the optical path 41. The two ends of the bubble are illustrated in FIG. 5, and when the apparatus is level, the two ends 50 and 51 are exactly adjacent one another. All that is then necessary is for the surveyor to move his eye to the eyepiece 48 of the telescope 13, through which he can see the rod and note the reading thereon, after having adjusted the focusing wheel 17.

The invention thus provides an attachment which serves both to give a swift levelling of the telescope of the quick-set level, and a swift sighting of the chain-man's rod before the actual level reading is taken. By having the aperture 43 close to the eyepiece 48 of the telescope, the surveyor does not have to move his head very far. Furthermore, the use of the attachment greatly reduces the eye-strain which is normally encountered using a conventional sighting device attached to the telescope.

While the optical system 35 has been illustrated as enclosed in a removable unit 11, it could of course form part of the level itself. If this were so, then there would be no need to provide the adjusting threads 21 and 33. However, the manufacturer may decide to provide a screwdriver adjustment so that the components can be accurately set in the factory.

Furthermore, the attachment illustrated in the drawings can be removed and can be used as a level in its own right. Thus, if the box 20 is suitably mounted on a tripod or other support, adjustment of the screw 33 can be effected to level the instrument that has been described above. Thereafter, if a horizontally arranged marker is vertically movably attached to the chain-man's rod, two images of this marker will appear. If the marker is now moved up or down, until these two images are level with one another, i.e. in coincidence, then this marker will be level with the optical system of the attachment of the invention. Thus the attachment has itself acted as a level, and either a note can be made of the position of the marker on the chain-man's rod, or this can be moved around a building or other site, with the marker still in the same position, to determine various points on the site with the same level.

Although the particular construction illustrated includes two objective apertures 45 and 46 which are distinct from one another, the two apertures, for the passage of the optical paths, could be formed by portions of a single aperture, for example the end portions of an elongate aperture. Furthermore, instead of using a part-silvered mirror, a semi-reflecting surface could be provided by any other suitable means, for example by a Swan cube, that is a cube made up of two isosceles triangle, right angled prisms (each similar to prism 37, 38, or 39) connected together along their hypotenuses.

Similarly prisms could be used in place of mirrors 31 and 32.

I claim:

1. A surveying instrument apparatus, said apparatus comprising, in combination:
   a. a screen;
   b. first and second apertures in said screen;
   c. a semi-reflecting surface behind said screen;
   d. means for obtaining two optical paths, one optical path being through said first aperture in said screen and directly through, and at an acute angle to, said semi-reflecting surface, to provide an upright image of an object being observed; and
   e. three planar reflecting surfaces disposed in three different planes so as to produce a second optical path, effective to produce a vertically and horizontally inverted image of the object being observed by reflection from said semireflecting surface, and superimposed on the upright image, the apertures of said two optical paths being laterally spaced apart.

2. Surveying instrument apparatus, said apparatus comprising, in combination:
   a. a semi-reflecting surface;
   b. means for obtaining two optical paths, one optical path being directly through, and at an acute angle to, said semi-reflecting surface, to provide an upright image of an object being observed; and
   c. first, second and third planar reflecting surfaces disposed in three different planes effective to produce a second optical path, thereby to provide a vertical and horizontal inverted image of the object being observed by reflection from said semi-reflecting surface, and superimposed on the upright image, the first and second of said reflecting surfaces being disposed perpendicular to one another to provide a portion of said second optical path extending in an optical plane normal to both said first and second surfaces, the third reflecting surface being disposed perpendicular to said semi-reflecting surface and at 45° to said optical plane.

3. Apparatus as claimed in claim 2, wherein the second optical path is produced by first, second and third isosceles triangle prisms of equal size, each having two shorter faces and a hypotenuse face, the first and a second of said prisms having their shorter faces secured together and located in first plane, the third prism having one of its shorter faces secured to the other shorter face of the second prism, the unsecured shorter face of the third prism being arranged in a second plane, perpendicular to the said first plane, the unsecured shorter face of the third prism being placed adjacent, and at 45° to the semireflecting surface, whereby the hypotenuses of said prisms form said three planar reflecting surfaces.

4. Apparatus as claimed in claim 3, wherein the prisms are mounted so that said first plane is substantially at 45° to the horizontal.

5. Apparatus as claimed in claim 4, and further comprising a spirit level vial secured relative to said prisms, and first and second reflective faces mounted above the ends of the bubble of the spirit level vial, when the latter is in the horizontal position, the first reflective face being arranged in front of the semi-reflecting surface, and the second reflective face being arranged in front of the free face of the first prism, whereby an image of one end of the bubble is produced adjacent an inverted image of the other end of the bubble.

6. Apparatus as claimed in claim 5, and further comprising an eyepiece lens located optically behind said semi-reflecting surface to enlarge the images of the ends of the bubble.

7. Apparatus as claimed in claim 5 and further comprising a closed box adapted to be adjustably pivoted about a vertical axis with respect to the telescope of a sighting level, and a common mounting member adjustably pivoted about a horizontal axis in said box, the prisms, the semi-reflecting surface, the spirit level vial and the first and second mirror all being supported on said common mounting member.

8. Apparatus as claimed in claim 7, wherein said box includes a front wall having a pair of apertures, one aperture being positioned for the passage of the first optical path and the other for the passage of the second optical path.

9. Apparatus according to claim 7, wherein said closed box includes a lower wall provided with an opening positioned to allow light to pass into the box to illuminate the bubble.

* * * * *